United States Patent [19]

Ostrand et al.

[11] Patent Number: 5,036,753
[45] Date of Patent: Aug. 6, 1991

[54] DUAL MODE AIR OUTLET FOR AIR CONDITIONING SYSTEM

[75] Inventors: James C. Ostrand, Armada; Todd M. Tumas, Taylor, both of Mich.

[73] Assignee: General Motors Corporation, Detroit, Mich.

[21] Appl. No.: 591,994

[22] Filed: Oct. 1, 1990

[51] Int. Cl.$^5$ .............................................. B60H 1/34
[52] U.S. Cl. ........................................ 98/2; 98/40.24
[58] Field of Search ............... 98/2, 2.05, 2.06, 2.11, 98/40.24, 40.26, 40.27

[56] References Cited

U.S. PATENT DOCUMENTS 3,802,328  4/1974  Kakizaki ................................. 98/2
4,970,947  11/1990  Soethout ................................. 98/2

FOREIGN PATENT DOCUMENTS 2444116  3/1976  Fed. Rep. of Germany ............ 98/2
0033048  2/1983  Japan ........................................ 98/2
0244618  12/1985  Japan ........................................ 98/2

Primary Examiner—Henry A. Bennett
Assistant Examiner—W. Doerrler
Attorney, Agent, or Firm—Ronald L. Phillips

[57] ABSTRACT

An air outlet for a motor vehicle air conditioning system has end vanes that may be pivoted in parallel with a central group of vanes or positioned at opposite angles to each other and transverse to the central group by operation of a lever, a rotary-to-linear actuator mounted on the lever and a wire form spring.

5 Claims, 2 Drawing Sheets

DUAL MODE AIR OUTLET FOR AIR CONDITIONING SYSTEM

TECHNICAL FIELD

This invention relates to air outlets for air conditioning systems and more particularly to a vane arrangement therein that is operable to provide parallel directed flow and, alternatively, diffused flow.

BACKGROUND OF THE INVENTION

Normally, the air outlet(s) in an air conditioning system such as used in motor vehicles has a row of vanes that are mounted in a pivotal frame and are linked for pivotal movement in parallel relationship to provide variable direction flow in two mutually perpendicular directions (vertical and horizontal). And where it is desired to diffuse the exiting air for wider area coverage of the air jet and/or comfort reasons, it is common practice to add fixed diffuser vanes in the outlet that direct some of the air at intersecting angles with the flow from the first mentioned vanes. However, the fixed angle of the diffuser vanes is not suited to all the possible angles of the pivotal vanes and can as a result cause a significant loss in air velocity, a wide temperature differential across the air jet, and a coverage area that varies with the direction of the pivotal vanes. And these are all important considerations within the relatively small confines of a motor vehicle passenger compartment as compared with home, commercial and industrial space.

SUMMARY OF THE INVENTION

The present invention is in a very simple cost effective mechanical dual mode arrangement that can be manually switched between all parallel vane directed flow and diffused or transverse directed vane flow. This is accomplished with a pivotal frame in which a row of air vanes are mounted for pivotal movement about axes transverse to the frame axis. Simple linkage links a central group of the vanes in parallel relationship for conjoint pivotal movement by a lever that is fixed to one of these vanes and is thereby also operable to pivot the frame about its axis. A singular spring and dual coupling link arrangement normally holds the vanes at the ends of the row in coupled parallel pivoting relationship with the vanes in the central group for operation therewith by the lever. And a rotary-to-linear actuator mounted centrally of the lever is selectively operable on the spring to force the end vanes into diffuser positions at opposite angles to each other and transverse to the vanes in the central group while leaving the latter vanes free to be pivoted by the lever.

It is therefore an object of the present invention to provide a new and improved dual mode air outlet for a motor vehicle air conditioning system.

Another object is to provide an air outlet for a motor vehicle air conditioning system wherein selected vanes can be pivoted from a single location at the outlet to provide normal and diffused air flow.

Another object is to provide an air outlet for a motor vehicle air conditioning system wherein vanes in a frame are selectively pivotal with the frame and also relative to each other to provide directionally controlled normal and diffused air flow.

Another object is to provide an air outlet for a motor vehicle air conditioning system having essentially a single actuator that is operable through a linkage and spring arrangement to pivot air directing vanes about their axes in parallel and transverse relationship and also conjointly about a mutual axis.

These and other objects, advantages and features of the present invention will become more apparent from the following description and drawing.

DESCRIPTION OF THE PREFERRED EMBODIMENT

Figure 1:
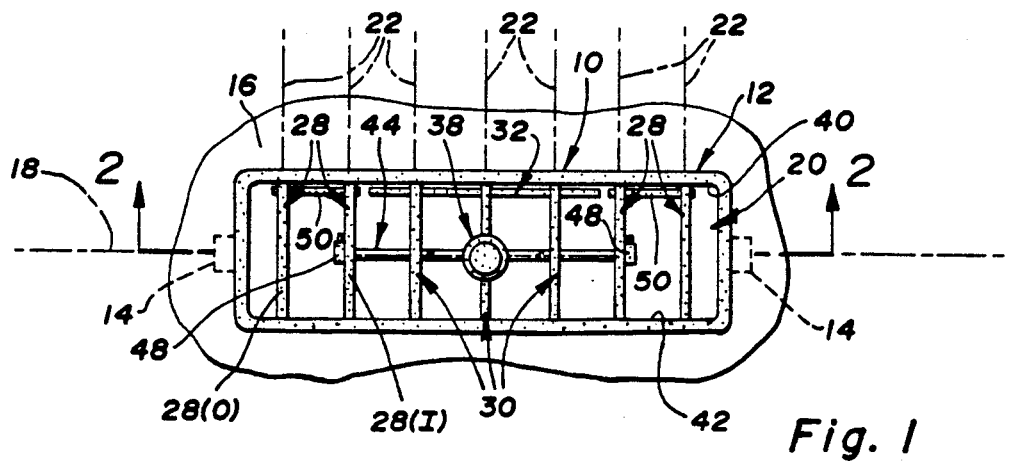
FIG. 1 is a front view of an air outlet according to the present invention.
Figure 2:
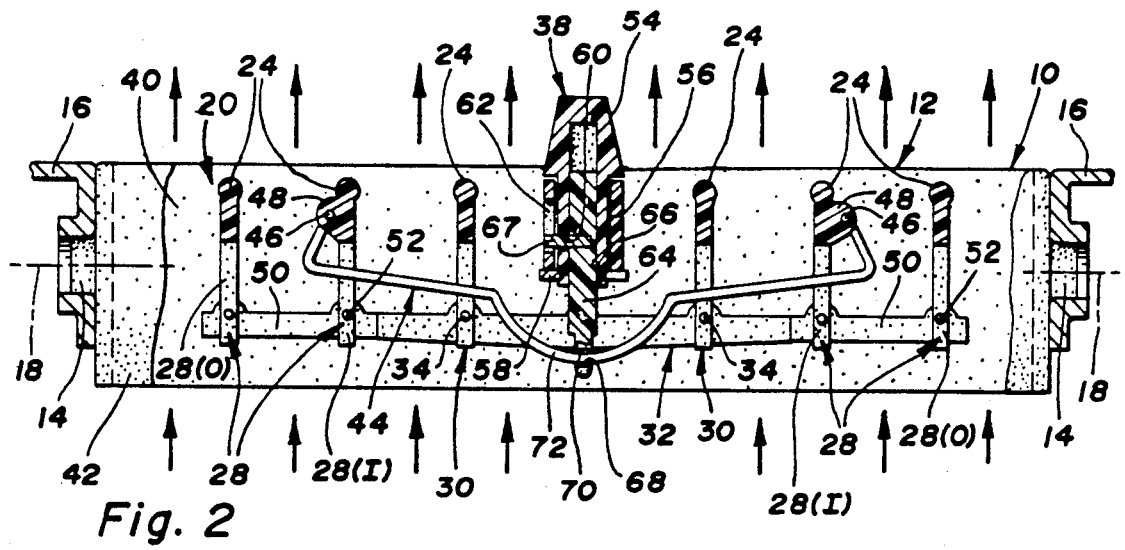
FIG. 2 is an enlarged view taken along the line 2—2 in FIG. 1 with the vanes in a normal mode.
Figure 3:
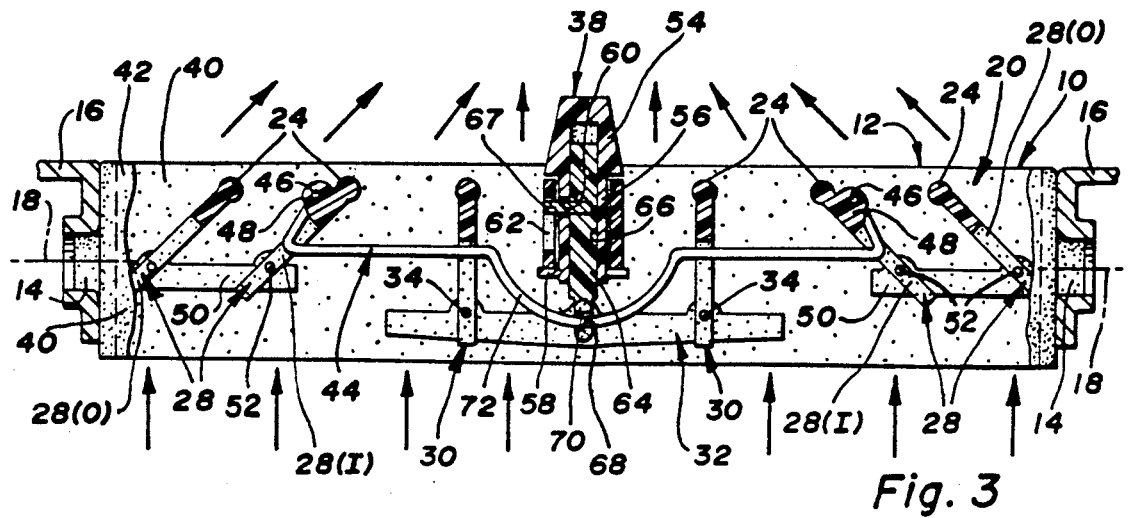
FIG. 3 is a view similar to FIG. 2 but with the vanes in a diffuser mode.
Figure 4:
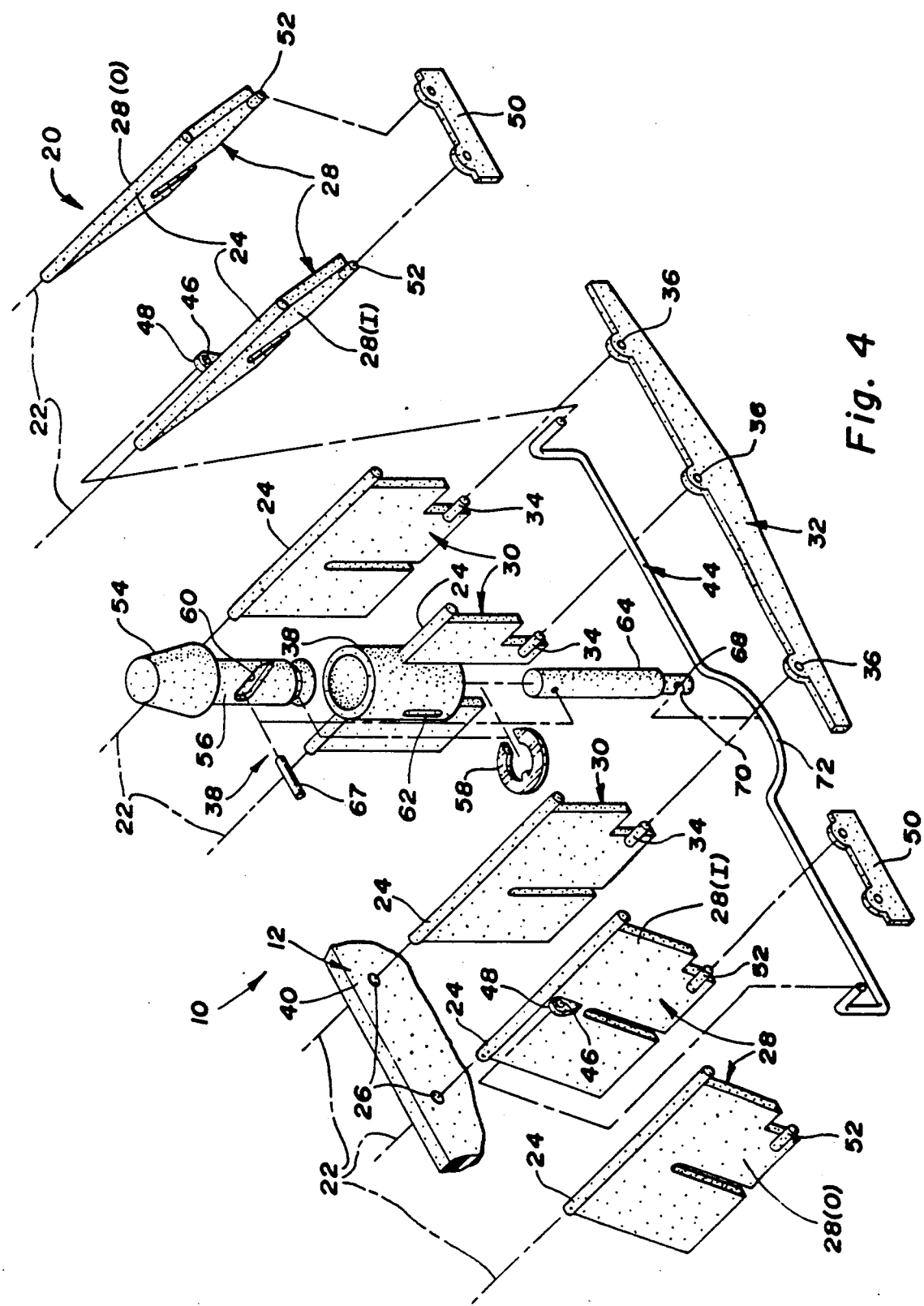
FIG. 4 is an exploded view of the vane arrangement in the above views.

Referring to FIGS. 1 and 2 for directing conditioned air in the direction of the arrows into the vehicle's passenger compartment, there is shown an air outlet 10 for a motor vehicle air conditioning system. The air outlet comprises a rectangular plastic frame 12 having cylindrical surfaces 14 at its short sides by which it is mounted in the vehicle's dashboard 16 for pivotal movement about a horizontal axis 18. As seen in FIGS. 2-4, a straight row of air directing rectangular plastic vanes 20 are mounted in the frame for pivotal movement in vertical planes about parallel axes 22 by a hinge pin 24 that is formed integral with one of the long edges of the respective vanes and snap fits at its opposite ends into pockets 26 in the inner surface of the frame's long sides.

The row of vanes 20 comprise one or more diffuser/directional vanes 28 at each end of the row (two being shown) and a central group of directional vanes 30 located centrally of the diffuser vanes. A rigid horizontally arranged link 32 is pivotally connected to the central directional vanes 30 by a pivot pin 34 that is formed integral with one corner of the respective vanes. The pivot pins 34 are located opposite their vane's hinge pin 24 and extend rearward in line with the other long edge of the vane and parallel to the latter's pivot axis. The pivot pins 34 are received in a straight row of equally spaced holes 36 in the link 32 that thus link the directional vanes in parallel relationship for conjoint pivotal movement about their respective axis 22.

A lever 38 in the form of a tubular section integrally formed with the center one of the vanes 30 in the central group extends centrally outward from the front of the air inlet. The lever 38 is adapted to be manipulated by a passenger to pivot the frame 12 about its axis 18 upon movement of the lever about this axis through the pivotal connection of this vane with the frame. This movement adjusts the angle of the upper and lower sides 40 and 42 of the frame and thereby the up and down angularity of the air flow into the passenger compartment.

A single wire form spring 44 extends horizontally across the rear side of the vanes and is bent at its ends to be received in a hole 46 formed in a lug 48 on the innermost diffuser/directional vanes 28(I) near the opposite ends of the vane row. The lugs 48 are formed integral with and extend outwardly from the outboard side of the respective vanes 28(I) near their hinge pin. And a dual link 50 and pivot pin 52 arrangement similar to that linking the directional vanes links the two diffuser/directional vanes 28(I) and 28(O) at each end of the row in similar manner for conjoint pivotal movement in parallel relationship about their respective axis 22. The diffuser/directional links 50 are located outboard of and in alignment with the directional vanes' link 32 and the spring 44 is preformed so that as installed as shown in FIG. 2 it acts to normally hold the former outboard links in end contact with the opposite ends of the latter central link and thereby hold the diffuser/directional vanes in coupled pivoting relationship with the directional vanes. The dimensional relationship between the dual links 50 and central link 32 is determined so that the diffuser/directional vanes 28 are coupled by the spring in parallel with the directional vanes 30 in this mode which shall be referred to as the normal or undiffused mode as the diffuser/directional vanes then operate the same as and in conjunction with the directional vanes.

For conditioning the air outlet in a diffuser mode, there is provided actuator means comprising a rotary plastic knob 54 having an integral cylindrical spindle 56 by which the knob is mounted for rotary movement in the lever 38. The knob is retained by an E-type snap ring 58 and has a left-hand helical 60 opposite an axially extending slot 62 in the lever 38. A cylindrical rotary/-linear plastic actuator pin 64 is mounted for rotary and linear movement in a blind cylindrical bore 66 in the rear end of the spindle 56 and has a drive pin 67 fixed radially thereto that extends out through the helical slot 60 and straight slot 62. Thus, clockwise rotation of the knob by a passenger is translated into linear movement of the actuator pin 64 outward of the spindle 56 and counterclockwise rotation results in inward movement of the actuator pin.

The projecting end of the actuator pin has a hole 68 with a ramped side opening 70 thereto (see FIG. 4) by which a centrally located curved portion 72 of the wire spring is received and retained in the hole, the ramped side opening being slightly smaller at its narrowest point than the wire diameter for deflectable forced entry and then capturing of the wire. The curve of the wire portion 72 corresponds to the arc that the hole in the actuator pin tracks when the latter is fully extended (knob turned clockwise) so that the actuator pin then has no affect on the wire except for helping to maintain it in position to normally hold the diffuser/directional vanes coupled with the regular directional vanes in the undiffused mode. Alternatively, when the knob is turned counterclockwise and retracts the actuator pin, the latter pulls on the wire spring forcing it into an over-the-center condition to position and hold the diffuser/-directional vanes in their diffuser positions shown in FIG. 3 while the regular directional vanes remain free to be conjointly pivoted about their respective axis by the lever that supports the knob in this, the diffuser mode. And this conditioning of the diffuser/directional vanes by the actuator from the undiffused mode to the diffused mode is possible in whatever pivoted position these vanes are then in because of the actuator pin tracking the curved spring portion with the lateral pivotal movement of the lever to place the vanes in this position. Furthermore, it will be appreciated that the knob serves as an extension of the lever for grasping by a passenger.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally and equitably entitled.

The embodiments of the invention in which an exclusive property or privilege is claimed are defined as follows:

1. An air outlet for a motor vehicle air conditioning system comprising a frame, a row of air directing vanes, mounting means mounting said vanes in said frame for pivotal movement on said frame, said row of vanes comprising end vanes at each end of said row and a central group of vanes central of said end vanes, linkage means linking said central group of vanes in parallel relationship for conjoint pivotal movement, singular spring means and dual coupling means for cooperatively normally holding said end vanes in coupled parallel pivoting relationship with the vanes in said central group, lever means connected to one of said vanes in said central group for pivoting said central group of vanes through cooperation with said link means and said end vanes through cooperation with said spring means and coupling means upon lever movement about the axis of said one vane, and actuator means for selectively operating on said spring means to force said end vanes into diffuser positions at opposite angles to each other and transverse to the vanes in said central group while leaving the latter vanes free to be pivoted about their axes by said lever means.

2. An air outlet for a motor vehicle air conditioning system comprising a pivotal frame, support means supporting said frame for pivotal movement about an axis, a row of air directing vanes, mounting means mounting said vanes in said frame for pivotal movement on said frame about axes transverse to said frame axis, said row of vanes comprising end vanes at each end of said row and a central group of vanes central of said end vanes, linkage means linking said central group of vanes in parallel relationship for conjoint pivotal movement, singular spring means and dual coupling means for cooperatively normally holding said end vanes in coupled parallel pivoting relationship with the vanes in said central group, lever means connected to one of said vanes in said central group for pivoting said frame by the pivotal connection of said one vane with said frame upon lever movement about the frame axis and for also pivoting said central group of vanes through cooperation with said link means and said end vanes through cooperation with said spring means and coupling means upon lever movement about the axis of said one vane, and actuator means for selectively operating on said spring means to force said end vanes into diffuser positions at opposite angles to each other and transverse to the vanes in said central group while leaving the latter vanes free to be pivoted about their axes by said lever means.

3. An air outlet for a motor vehicle air conditioning system comprising a pivotal frame, a row of air directing vanes, mounting means mounting said vanes in said frame for pivotal movement on said frame, said row of vanes comprising end vanes at each end of said row and a central group of vanes central of said end vanes, linkage means linking said central group of vanes in parallel relationship for conjoint pivotal movement, singular spring means and dual coupling means for cooperatively normally holding said end vanes in coupled parallel pivoting relationship with the vanes in said central group, lever means connected to one of said vanes in said central group for pivoting said central group of vanes through cooperation with said link means and said end vanes through cooperation with said spring means and coupling means upon lever movement about the axis of said one vane, and actuator means mounted on said lever means for converting rotary movement into linear movement that operates on said spring means so as to force said end vanes into diffuser positions at opposite angles to each other and transverse to the vanes in said central group while leaving the latter vanes free to be pivoted about their axes by said lever means.

4. An air outlet for a motor vehicle air conditioning system comprising a pivotal frame, support means supporting said frame for pivotal movement about an axis, a row of air directing vanes, mounting means mounting said vanes in said frame for pivotal movement on said frame about axes transverse to said frame axis, said row of vanes comprising end vane at each end of said row and a central group of vanes central of said end vanes, linkage means linking said central group of vanes in parallel relationship for conjoint pivotal movement, singular spring means and dual coupling means for cooperatively normally holding said end vanes in coupled parallel pivoting relationship with the vanes in said central group, lever means connected to one of said vanes in said central group for pivoting said frame by the pivotal connection of said one vane with said frame upon lever movement about the frame axis and for also pivoting said central group of vanes through cooperation with said link means and said end vanes through cooperation with said spring means and coupling means upon lever movement about the axis of said one vane, and actuator means mounted on said lever means for converting rotary movement into linear movement that operates on said spring means so as to force said end vanes into diffuser positions at opposite angles to each other and transverse to the vanes in said central group while leaving the latter vanes free to be pivoted about their axes by said lever means.

5. An air outlet for a motor vehicle air conditioning system comprising a pivotal frame, support means supporting said frame for pivotal movement about an axis, a row of air directing vanes, mounting means mounting said vanes in said frame for pivotal movement on said frame about axes transverse to said frame axis, said row of vanes comprising end vanes at each end of said row and a central group of vanes central of said end vanes, linkage means linking said central group of vanes in parallel relationship for conjoint pivotal movement, a wire form spring and dual coupling means for cooperatively normally holding said end vanes in coupled parallel pivoting relationship with the vanes in said central group, lever means connected to one of said vanes in said central group for pivoting said frame by the pivotal connection of said one vane with said frame upon lever movement about the frame axis and for also pivoting said central group of vanes through cooperation with said link means and said end vanes through cooperation with said spring means and coupling means upon lever movement about the axis of said one vane, and actuator means centrally mounted on said lever means for converting rotary movement into linear movement that operates to pull said spring into an over-the-center condition that forces said end vanes into diffuser positions at opposite angles to each other and transverse to the vanes in said central group and holds said end vanes in said diffuser positions while leaving the vanes in said central group free to be pivoted about their axes by said lever means.

* * * * *